Figure 1:
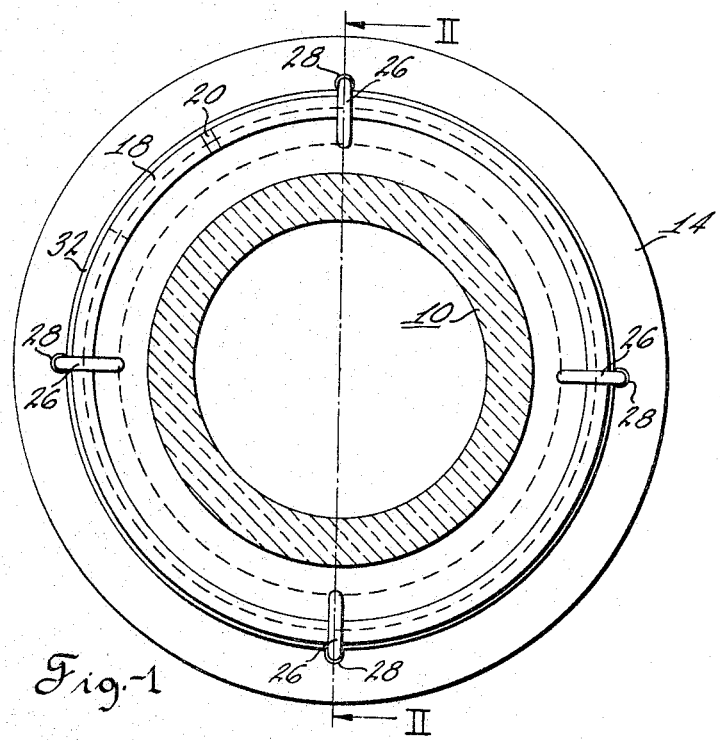

Aug. 8, 1967     H. J. WESOLOWSKI     3,334,662

MEANS FOR SEALING THE END OF A HOLLOW TUBULAR MEMBER

Filed Dec. 22, 1964

Inventor
Henry J. Wesolowski
By Thomas F. Kirby
Attorney

United States Patent Office 3,334,662
Patented Aug. 8, 1967

3,334,662
MEANS FOR SEALING THE END OF A HOLLOW TUBULAR MEMBER
Henry J. Wesolowski, Milton, Mass., assignor to Allis-Chalmers Manufacturing Company, Milwaukee, Wis.
Filed Dec. 22, 1964, Ser. No. 420,300
8 Claims. (Cl. 138—89)

This invention relates to means for sealing the end of a hollow tubular member.

In the electrical industry, for example, certain types of vacuum switches employ a vacuum tight envelope which comprises a glass or ceramic hollow cylinder which is closed at its ends by metal plates. Formerly, each plate was secured to an end of the cylinder by means of a clamp which engaged the plate and also a flange which was machined or molded on the exterior of the cylinder. Thus, a specially made, costly cylinder was required and skilled labor was required in assembly to avoid breaking or damaging the flange.

It is an object of the present invention to provide improved means for sealing the ends of hollow tubular members which overcome the aforesaid disadvantages.

Another object is to provide improved means for sealing the ends of hollow tubular members made of glass, ceramic or the like, with imperforate members such as metal plates.

Another object is to provide means of the aforesaid character which provide a vacuum-tight seal.

A specific object is to provide improved means for closing off the ends of the glass or ceramic tubes employed in vacuum switches.

Another object is to provide improved sealing means of the aforesaid character which can be employed with standard glass or ceramic extrusion pipe which is simply cut to desired length and scored.

Other objects and advantages of the invention will hereinafter appear.

The accompanying drawing illustrates a preferred embodiment of the invention but it is to be understood that the embodiment illustrated is susceptible of modifications wtih respect to details thereof without departing from the scope of the appended claims.

Figure 2:
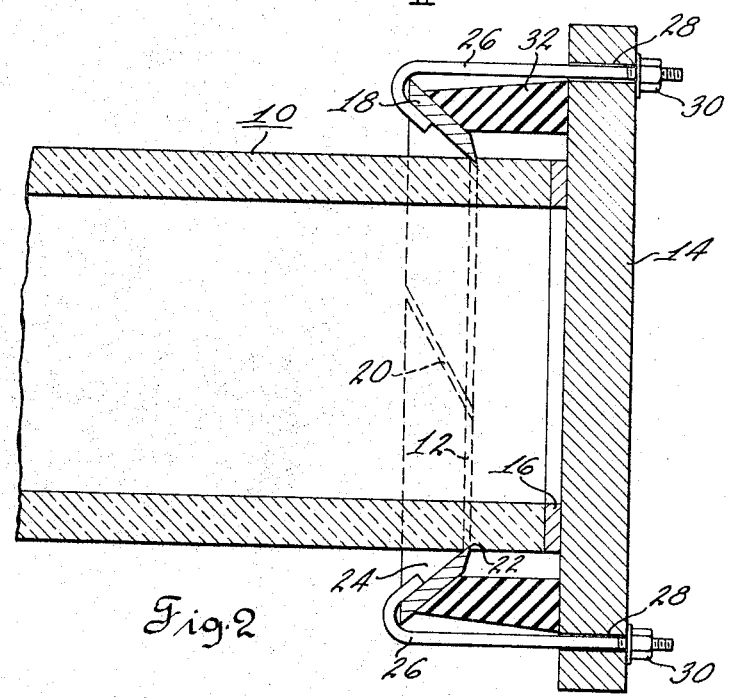

In the drawing:

FIG. 1 is a view looking toward one end of a hollow tubular member which is provided with sealing means incorporating the present invention; and FIG. 2 is a cross sectional view taken along line II—II of FIG. 1.

Referring to the drawing, the numeral 10 designates a hollow tubular member such as a glass or ceramic cylindrical pipe. The exterior of member 10 is provided with a scribed or scored slot 12 which extends entirely around the circumference or periphery of the member and is achieved, for example, by a simple machining operation.

A closure member 14, such as an imperforate metal plate, is located adjacent the end of tubular member 10. Gasket means in the form of an annular metal washer 16 is located between the end of tubular member 10 and closure member 14 to fill any interstices that might otherwise occur if the end of the tubular member bore directly against the face of member 14.

An annular member or collar 18 is disposed around tubular member 10 and is adapted to engage scored slot 12 and to be drawn toward closure member 14. Annular member 18 is split as at 20 so that it can be compressed to make a tight fit around tubular member 10 and slot 12 therein. Annular member 18 preferably has a trapezoidal cross sectional configuration so that a knife edge 22 is provided for engagement with scored slot 12 and so that a space 24 exists between member 18 and the exterior of tubular member 10.

Clamping means in the form of a plurality of J-shaped bolts 26 are provided to draw annular member 18 (and thus tubular member 10) toward closure member 14. Each bolt 26 has a curved end for hooking onto the edge of annular member 18, the space 24 permitting this, and has a threaded end which extends through a hole 28 in closure member 14. Each bolt 26 is provided with a nut 30 which, when taken onto the bolt, causes the drawing together of annular member 18 and closure member 14.

Locking means are provided to force knife edge 22 of annular member 18 tightly into scored slot 12 in tubular member 10. The locking means takes the form of an annularly shaped resilient ring 32 which is located between annular member 18 and the face of closure member 14. As collar 18 is drawn toward closure member 14 by the bolts 26, it bears against resilient ring 32 which exerts a counteracting force tending to squeeze the split ring collar together and to cause knife edge 22 to bear tightly into scored slot 12 on tubular member 10.

During assembly, tubular member 10 is cut to desired length and is scored as at 12. Collar 18 and resilient ring 32 are slipped in place on tubular member 18. Then, gasket 16 is placed at the end of tubular member 10, and plate 14, with bolts 26 loosely attached, is placed against the gasket. The bolts 26 are then hooked onto collar 18 and the nuts 30 are taken up to tighten the assembly. As the nuts 30 are tightened, collar 18 is adjusted so that its knife edge 22 engages scored slot 12. As the nuts 30 are further tightened, compression of ring 32 causes firm engagement of collar 18 with slot 12 and tubular member 10 is drawn firmly toward plate 14 to compress gasket 16. Thus, a vacuum-tight seal is formed which can be readily disassembled and reassembled without damage to any components.

The embodiments of the invention in which an exclusive property or privilege is claimed are defined as follows:

1. In combination, a hollow tubular member, said member having a scored slot around its periphery, a closure member disposed adjacent one end of said tubular member, an annular member having a knife edge disposed around said tubular member so that said knife edge engages said scored slot in said tubular member, and clamping means connected between said closure member and said annular member for drawing the closure member and said annular member toward each other.

2. In combination, a hollow tubular member, said member having a scored slot around its periphery, a closure member disposed adjacent one end of said tubular member, an annular member having a knife edge disposed around said tubular member so that said knife edge engages said scored slot in said tubular member, clamping means connected between said closure member and said annular member for drawing the closure member and said annular member toward each other, and locking means for forcing said annular member tightly against said tubular member.

3. The combination according to claim 2 wherein said annular member is a split ring.

4. In combination, a hollow tubular member, said member having a scored slot around its periphery, a closure member disposed adjacent one end of said tubular member, a split ring annular member having a knife edge disposed around said tubular member so that said knife edge engages said scored slot in said tubular member, clamping means connected between said closure member and said split ring for drawing the closure member and split ring toward each other, and locking means disposed between said closure member and said split ring, said locking means tending to force said annular member tightly against said tubular member.

5. The combination according to claim 4 including a sealing gasket disposed between said one end of said tubular member and said closure member.

6. In combination, a hollow tubular member, said member having a scored slot around its periphery, a closure member disposed adjacent one end of said tubular member, a split ring annular member having a knife edge disposed around said tubular member so that said knife edge engages said scored slot in said tubular member, clamping means connected between said closure member and said split ring for drawing the closure member and split ring toward each other, and resilient annular locking means disposed around said hollow tubular member between said closure member and said split ring, said locking means tending to force said annular member tightly against said tubular member.

7. The combination according to claim 4 including a sealing gasket disposed between said one end of said tubular member and said closure member.

8. In combination, a hollow frangible tubular member, said member having a scored slot around its periphery, a closure member disposed adjacent one end of said tubular member, a split ring annular member having a knife edge disposed around said tubular member so that said knife edge engages said scored slot in said tubular member, said split ring having a trapezoidal cross sectional configuration, clamping means comprising a plurality of J-shaped members connected between said closure member and said split ring for drawing the closure member and split ring toward each other, and resilient annular locking means disposed around said hollow tubular member between said closure member and said split ring, said locking means tending to force said annular member tightly against said tubular member.

References Cited

UNITED STATES PATENTS

| | | | |
|---|---|---|---|
| 1,556,745 | 10/1925 | Banta | 277—101 |
| 1,647,008 | 10/1927 | Lawrence | 174—163 X |
| 2,444,380 | 6/1948 | Shimek | 285—340 |
| 2,474,880 | 7/1949 | Woodling | 285—340 X |

FOREIGN PATENTS

| | | |
|---|---|---|
| 702,347 | 1/1965 | Canada. |
| 1,266,673 | 6/1961 | France. |

LAVERNE D. GEIGER, *Primary Examiner.*

T. L. MOORHEAD, *Assistant Examiner.*